(No Model.)
C. W. SIVER.
AUTOMATIC SPRINKLER.
No. 560,373. Patented May 19, 1896.
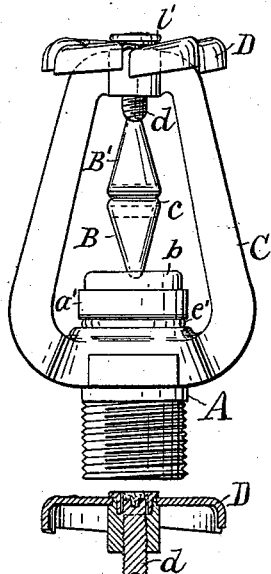
Fig. 1.
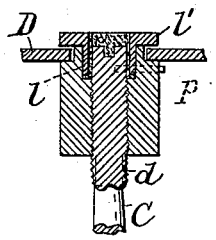
Fig. 3.
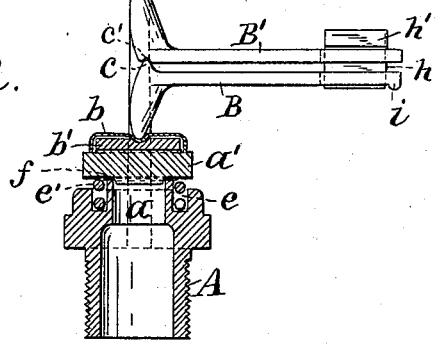
Fig. 2.
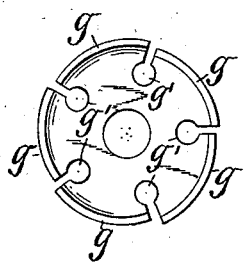
Fig. 6
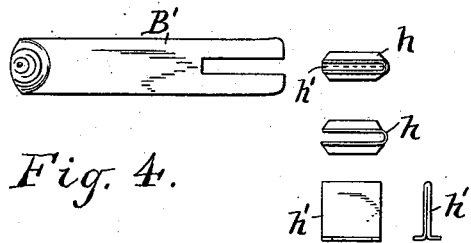
Fig. 4.
Fig. 5.
Witnesses:
Mark W. Dewey
A. S. Dewey
Inventor.
Charles W. Siver
By C. H. Duell
his Attorney.

UNITED STATES PATENT OFFICE.

CHARLES W. SIVER, OF SYRACUSE, NEW YORK, ASSIGNOR TO THE MANUFACTURERS' AUTOMATIC SPRINKLER COMPANY, OF SAME PLACE.

AUTOMATIC SPRINKLER.

SPECIFICATION forming part of Letters Patent No. 560,373, dated May 19, 1896.

Application filed August 2, 1895. Serial No. 557,960. (No model.)

*To all whom it may concern:*

Be it known that I, CHARLES W. SIVER, of Syracuse, in the county of Onondaga, in the State of New York, have invented new and useful Improvements in Automatic Sprinklers, of which the following, taken in connection with the accompanying drawings, is a full, clear, and exact description My invention relates to improvements in automatic sprinklers or fire-extinguishers organized to release a valve by thermal action at a predetermined temperature, and the objects are to provide a strong and efficient strut or device for normally holding the valve to its seat and for releasing the valve when the temperature is raised sufficiently, to provide means whereby the adjustable screw holding the strut may be sealed or held from turning after it has once been properly adjusted, and also to provide means whereby the valve will be forced from its seat after the strut has been released even without the pressure of the water. Heretofore struts of this nature have been provided with curved arms, which were bent to lie closely to the sprinkler-head, which form is objectionable for several reasons, one being that the soldered releasing device is thereby brought too close to the head and is cooled by the latter and thus prevented from acting as quickly as it otherwise would. The heat generated in the releasing device by the heated surrounding atmosphere is for some time radiated from said device toward the body of the head, which of course remains at a low temperature, owing to the bulk of metal and the body of water within. Such struts were defective also because of the knife-edges between them and the points entering the valve and opposite bearing. All of these objections I have overcome by extending the arms of the strut out straight from the body of the sprinkler, so that the solder-releasing device is removed to a considerable distance from the sprinkler-head, and by making all the bearings round and smooth.

Heretofore the head of the adjustable screw bearing upon one end of the strut was exposed and there was no means provided for locking it after it was once properly set or adjusted. This being so, the vibration of the pipes due to various causes often turned the screw loose and caused the sprinkler to leak more or less. In order to prevent leaking, an inexperienced person would tighten the screw more than was required, the consequence being that the link or soldered fastening device holding the strut would be strained and weakened, causing it to let go and give the full flow of water and causing much damage. This objection is overcome by concealing the head of the screw or otherwise locking the same, so that it cannot turn loose of itself, making it unnecessary to tighten the same and preventing all leakage.

To this end my invention consists in the combination, with the valve-seat, the valve thereon, and the bearing opposite the valve, of a pair of angular levers having straight end portions extending outward at right angles to the axle of the sprinkler-head, one of said levers being provided at its angle with a rib curved in cross-section and lying in a curved recess in the other lever, and a device composed of two metal pieces soldered together, securing the ends of the said straight end portions together; and my invention consists in certain other combinations of parts hereinafter described, and specifically set forth in the claims.

In the drawings hereto annexed and forming a part of this specification, Figure 1 is a side elevation of my improved automatic sprinkler. Fig. 2 is a vertical sectional view of the same. Fig. 3 is an enlarged sectional view of the upper part of the sprinkler. Fig. 4 is a top plan view of the upper lever forming the strut. Fig. 5 shows various views of the parts forming the releasing device, and Fig. 6 is a view of the lower or concave side of the rotary deflector preferably employed with the sprinkler-head to spray the water issuing from the nozzle.

Referring specifically to the drawings, A is the nozzle of the sprinkler, $a$ is the outlet or valve-seat, and $a'$ is the valve or movable cover for the outlet, which is formed of porcelain. The said valve is a disk of a size somewhat larger than the outlet, having its central portion thicker than its rim to hold itself in a central position over the outlet and also in order that the metal diaphragm above may be held in its central position. The diaphragm *b* is provided with a cavity or depression in its top side, as shown, to receive one end of the strut. In order to strengthen the diaphragm or relieve it of strain and in order that the pressure exerted by the strut may be distributed over the greater part of the upper surface of the porcelain disk, I place a disk of metal *b'* within or below the diaphragm and provide the disk *b'* also with a small cavity in its center and upper side to receive the projection on the lower side of the diaphragm. In the valve-seat surrounding the outlet is an annular groove *e*, containing a coil-spring *e'*, which bears against the lower side of the porcelain valve. One or more disks *f*, of lead or copper, or both, is placed below the porcelain valve or between it and the valve-seat. This spring serves to throw the valve off the outlet quickly and fully as soon as it is released by the separation of the strut. The lead or copper disks or washers serve as a packing. There is a space between the valve and the nozzle outside the spring, as clearly shown in the drawings, so that the spring *e'* may be covered and the groove filled with paraffin or other suitable material to prevent rusting. This may be effected also by coating the spring before it is placed in the groove with japan or varnish.

C is the frame or yoke of the sprinkler and extends upward from diametrically opposite sides of the nozzle and above and directly opposite the outlet. A screw *d* extends downward through the yoke, the line of its axis being vertical and extending through the center of the diaphragm *b*. The screw is provided with a smooth rounded cavity in its lower end to receive the upper rounded end of the strut. The said screw has a groove in its upper end by which it is adjusted; but it is straight and without a head. After it is adjusted the upper end lies about flush with the upper end of the yoke. There is a circular space *l* around the upper end of the screw. In this space is placed a flanged ring or bushing *l'*, which projects above the end of the screw. The said ring is soldered in place and the end of the screw covered with solder, thus preventing it from working loose.

Fig. 3 shows a pin *p* in dotted lines extending through the yoke and ring and into the screw, preventing the latter from turning. The latter may be used, or various other well-known means, instead of the solder to lock the screw; but the solder is preferred.

The flanged ring serves to hold the rotary distributer or deflector D upon its axle. Any suitable distributer may be employed; but I prefer to use one the same or similar to that shown in the drawings. This distributer has a flanged divided edge, which is turned down, the teeth *g* being twisted or bent, as shown in the drawings, so that the escaping water as it strikes said teeth shall cause the distributer to rotate with great rapidity. The holes or circular apertures *g'* at the ends of the slots forming the divisions serve to more uniformly wet the surrounding surfaces.

It will be obvious that my improved sprinkler may be employed either as an upright or as a pendent head. The valve holding the releasing device or "strut," as it is technically called, consists of a pair of substantially obtuse angular levers or bars B and B', arranged one above the other, with a fulcrum between them close to the angles. The fulcrum consists of a rib *c*, extending transversely across the lower lever. The rib is curved in cross-section—that is, it is rounded and not sharp or angular—and fits or rather lies in a correspondingly-shaped groove or recess *c'* in the lower side of the upper or opposite lever. The levers are of substantially the same shape and size, aside from the difference referred to, and are turned so that their angles are adjacent. Their long sides, which are flat and straight, form springs and lie parallel or nearly parallel, and their shorter sides extend one upward to the bearing opposite the center of the valve and the other downward to the center of the valve or diaphragm. The free ends of the levers are bifurcated or slotted vertically and longitudinally to receive an inverted-T-shaped metal piece *h*, preferably made by bending a strip of thin metal over upon itself for a portion of its length and with its ends extending in opposite directions at right angles to the doubled portion. The slots in the ends of the levers are about the length of this doubled metal piece, which has its doubled portion lying in and extending through the slots and its ends or flanges lying against the lower side of the lower lever, on each side of its slot. A U-shaped cap, of thin metal *h'* with a flange on each side, as shown clearly in the drawings, fits around the projecting doubled end and is soldered thereon, its flanges bearing upon the upper side of the upper lever. The holding device is soldered together before it is applied to the levers and is removable therefrom. When the holding device is applied, the free ends of the levers are pressed together until they nearly touch by hand or with a suitable clamp, so that it may be applied easily. The said holding device may be inverted upon the levers, if desired. In order that the soldered holding device may not be worked off by vibration, a small projection *i* is formed on the lower side of the lower lever, between the device and the end of said lever, as shown in Fig. 2.

Having described my invention, what I claim as new, and desire to secure by Letters Patent, is—

1. In an automatic sprinkler, the combination with the valve-seat, the valve thereon, the diaphragm on the valve and the bearing opposite the diaphragm having a smooth concave recess of a pair of angular levers between the diaphragm and concave bearing having straight end portions extending outward at right angles to the axis of the sprinkler-head, one of said levers being provided at its angle with a rib curved in cross-section and lying in a correspondingly-curved recess in the opposite lever, the ends of the levers being slotted, and a device composed of two metal pieces soldered together lying in slots in the ends of said levers and securing said ends together, as set forth.

2. In an automatic sprinkler, the combination with the nozzle provided with a valve-seat, the porcelain valve, the yoke extending above the valve, a diaphragm on the valve having a concavity in the center of its upper side, and having its edges turned down and lying in contact with the valve, an adjustable screw in the yoke opposite the center of the diaphragm and having a concavity in its end, a strut formed of a pair of angular levers having the angles opposite each other and to one side of a perpendicular line extending through the center of the diaphragm and screw, straight arms of the levers, extending horizontally, slots in the ends of said arms, and a soldered releasing device in the slots and holding the arms together as set forth.

3. In an automatic sprinkler, the combination with the nozzle the yoke extending from diametrically-opposite sides of and above the nozzle, the valve-seat, valve, diaphragm with concavity in its center resting with its edge on the valve, the disk with indentation in its center between the diaphragm and valve, a screw in the yoke directly above the concavity in the diaphragm, and having a concavity in its lower end, a strut formed of a pair of angular levers, the angles being opposite each other, and to one side of a perpendicular line extending through the axis of the screw, a rounded rib at the angle of one lever lying in a corresponding groove in the opposite lever, rounded points on the short ends of the levers to lie in the concavities in the diaphragm and screw, and suitable means to hold the free ends of the said levers together.

4. In an automatic sprinkler, the combination with the valve-seat, the valve thereon, the diaphragm and the bearing opposite the diaphragm, of a pair of angular levers having straight end portions extending outward at right angles to the axis of the sprinkler-head, one of said levers being provided at its angle with a rib curved in cross-section and lying in a correspondingly-curved recess in the opposite lever, an annular groove around the valve-seat and containing a coil-spring bearing upon the lower side of the valve, and a device composed of two metal pieces soldered together lying in slots in the ends of said levers and securing said ends together, as set forth.

5. In an automatic sprinkler the combination with the nozzle, valve, diaphragm and strut, of the yoke above the diaphragm the screw passing through the yoke, the annular space surrounding the upper end of the screw, the flanged ring in the said space and extending above the end of the screw, solder securing the ring to the yoke and screw and covering the upper end of the same, and the deflector between the yoke and the rim of the said ring, as set forth.

6. In an automatic sprinkler the combination with the nozzle, valve, diaphragm, and strut of the yoke above the diaphragm the screw passing through the yoke, the annular space surrounding the upper end of the screw, the flanged ring in the said space and extending above the end of the screw, and means to secure the ring and screw to the yoke to hold them rigidly in place, as set forth.

7. In an automatic sprinkler, the combination with the nozzle, valve, diaphragm and strut as described, of the yoke extending upward from diametrically-opposite sides of the nozzle and above the diaphragm, a headless screw passing through the yoke directly above the center of the diaphragm, the annular space surrounding the upper end of the screw, a flanged ring in the said annular space, and extending above the end of the screw, solder securing the ring to the yoke and screw and covering the upper end thereof, and a rotary deflector loosely mounted between the yoke and the rim of the ring and provided with a divided edge, circular apertures through the deflector at the ends of the slots and the teeth between the slots bent, substantially as described and shown.

8. In an automatic sprinkler, the combination with the nozzle valve, diaphragm and strut as described, of the yoke extending upward from diametrically-opposite sides of the nozzle and above the diaphragm a headless screw passing through the yoke directly above the center of the diaphragm, the annular space surrounding the upper end of the screw, a flanged ring in the said annular space, and extending above the end of the screw, solder securing the ring to the yoke, and screw, and covering the upper end thereof, and a rotary deflector loosely mounted between the yoke and the rim of the ring and provided with a divided edge, circular apertures through the deflector at the ends of the slots and the teeth between the slots bent, the annular recess in the valve-seat, and a coil-spring lying in the recess and bearing against the porcelain valve, as and for the purpose described.

In testimony whereof I have hereunto signed my name.

CHARLES W. SIVER. [L. S.]

Witnesses:
H. M. SEAMANS,
R. S. DEWEY.